US008274525B2

(12) United States Patent
Langendijk

(10) Patent No.: US 8,274,525 B2
(45) Date of Patent: Sep. 25, 2012

(54) CONVERTING COLOR PRIMARIES AND LUMINANCES OF AN INPUT SIGNALT TO DIFFERENT COLOR PRIMARIES AND LUMINANCES FOR A DISPLAY

(75) Inventor: Erno Hermanus Antonius Langendijk, Eindhoven (NL)

(73) Assignee: TP Vision Holding, B.V., Eindhoven (NL)

( * ) Notice: Subject to any disclaimer, the term of this patent is extended or adjusted under 35 U.S.C. 154(b) by 811 days.

(21) Appl. No.: 12/444,733

(22) PCT Filed: Oct. 5, 2007

(86) PCT No.: PCT/IB2007/054058
§ 371 (c)(1),
(2), (4) Date: Apr. 8, 2009

(87) PCT Pub. No.: WO2008/044177
PCT Pub. Date: Apr. 17, 2008

(65) Prior Publication Data
US 2010/0103200 A1 Apr. 29, 2010

(30) Foreign Application Priority Data

Oct. 12, 2006 (EP) .................................. 06122179
Dec. 18, 2006 (EP) .................................. 06126343

(51) Int. Cl.
| G09G 5/00 | (2006.01) |
| G09G 5/02 | (2006.01) |
| H04N 5/46 | (2006.01) |
| H04N 5/57 | (2006.01) |
| G03F 3/08 | (2006.01) |
| G06K 9/00 | (2006.01) |
| G06K 9/40 | (2006.01) |
| G09G 5/10 | (2006.01) |
| H04N 5/202 | (2006.01) |
| H04N 5/21 | (2006.01) |
| H04N 9/64 | (2006.01) |
| H04N 1/46 | (2006.01) |

(52) U.S. Cl. ........ 345/590; 345/591; 345/600; 345/690; 345/549; 348/254; 348/602; 348/631; 348/708; 358/518; 358/520; 358/523; 358/525; 382/162; 382/167; 382/254; 382/274

(58) Field of Classification Search .................. 345/581, 345/589, 590–591, 600–604, 606, 613, 617, 345/643, 547, 690, 549; 348/68–71, 269, 348/223, 227, 253–254, 557, 571, 602–603, 348/630–631, 671, 708; 358/518–520, 523–525, 358/447–448
See application file for complete search history.

(56) References Cited

U.S. PATENT DOCUMENTS
4,719,503 A * 1/1988 Craver et al. ................. 348/717
(Continued)

FOREIGN PATENT DOCUMENTS
WO 02099557 A1 12/2002

OTHER PUBLICATIONS
MacAdam, David L. et al "Maximum Visual Efficiency of Colored Materials" J.O.S.A. vol. 25, Nov. 193, pp. 361-367.

*Primary Examiner* — Wesner Sajous
(74) *Attorney, Agent, or Firm* — Shimokaji & Assoc., PC

(57) ABSTRACT

A color gamut mapping maps an input image signal which has input pixel colors defined by an input luminance and an input chromaticity into a mapped image signal which has corresponding mapped pixel colors defined by a mapped luminance and a mapped chromaticity for a display. The input pixel colors lie within the input color gamut different than the display color gamut. The desired mapped luminance may be retrieved by looking up stored desired luminance values in a look-up table at the mapped chromaticity, or by calculating a relative to white luminance, or a luminance decrease, etc.

18 Claims, 7 Drawing Sheets

U.S. PATENT DOCUMENTS

| | | | |
|---|---|---|---|
| 5,317,426 A * | 5/1994 | Hoshino | 358/515 |
| 5,883,632 A * | 3/1999 | Dillinger | 345/589 |
| 6,128,022 A * | 10/2000 | Dillinger | 345/591 |
| 6,342,951 B1 * | 1/2002 | Eschbach et al. | 358/1.9 |
| 6,791,716 B1 * | 9/2004 | Buhr et al. | 358/1.9 |
| 2004/0170319 A1 | 9/2004 | Maurer | |
| 2005/0185837 A1 * | 8/2005 | Takano et al. | 382/162 |
| 2007/0019254 A1 * | 1/2007 | Zeng | 358/504 |
| 2007/0070363 A1 * | 3/2007 | Zeng | 358/1.9 |
| 2007/0133017 A1 * | 6/2007 | Kobayashi | 358/1.9 |
| 2007/0146509 A1 * | 6/2007 | Hekstra et al. | 348/253 |

\* cited by examiner

CONVERTING COLOR PRIMARIES AND LUMINANCES OF AN INPUT SIGNALT TO DIFFERENT COLOR PRIMARIES AND LUMINANCES FOR A DISPLAY

FIELD OF THE INVENTION

The invention relates to a method of designing a display, a method of manufacturing a display, a display, and a computer program product.

BACKGROUND OF THE INVENTION

In order to show a color image, conventional displays have three primaries: red, green and blue. In Europe, the chromaticity coordinates of these three primaries are defined by the EBU standard for standard definition content, and by the Rec709 standard for high definition content. The chromaticity coordinates are also referred to as color points or colors. In other countries, different standards may define the colors of the three primaries. The chromaticity coordinates of the primaries in the EBU standard are in the CIE 1931 xy-color space for red: x=0.64 and y=0.33, for green: x=0.29 and y=0.60 and for blue: x=0.15 and y=0.06. The white point of the display is also defined in the EBU standard and is close to D65 (6500K) which has the chromaticity coordinates: x=0.3127 and y=0.3290. In practice, display manufactures may select another white point than D65. Many display apparatus have a somewhat more blue white point, for example, 8600K or even 10000K. This set of primary and white point colors determines the color behavior of the display. When using EBU primaries, white D65 is obtained by a ratio of the luminance's of the red, green and blue primaries of 22:71:7.

Such a conventional display with the above discussed three EBU primaries cannot reproduce all visible colors. Only the colors within the color triangle of which the primaries are the vertices can be displayed, or stated more accurately, the colors within the 3 dimensional display gamut can be displayed. Or said differently the color gamut of the EBU display is defined as the area in the chromaticity space within this triangle including its borders. Consequently, especially very saturated colors like the monochromatic colors cannot be reproduced. With monochromatic color is meant a color with a single peak at a particular wavelength in the visible light spectrum.

Recently, so-called wide gamut displays are getting more and more attention. These displays have primaries which are selected to obtain a larger color gamut than that of the EBU standard primaries. Hence, the wide gamut displays are able to produce colors which are more saturated than an EBU display. In a wide gamut LCD display the three primaries for the wide gamut may be obtained by adapting the spectrum of the backlight and/or changing the transmission band of the color filters. Alternatively, or additionally, a further primary may be added inside or outside the triangle but preferably within the visible range of colors. Wide gamut displays with 3 primaries are sometimes called enhanced gamut displays, and with more than 3 primaries, multiprimary displays.

Most content is coded within the gamut defined by the EBU primaries (i.e. the television camera records scenes according to this gamut, and most natural colors are not too saturated). For wide gamut displays, the display gamut may be very different from this input gamut. If the input image signal, which usually is an RGB signal, is used directly to drive the wide gamut display the color reproduction is distorted and for most images not preferred above the color reproduction of the usual EBU gamut. A better color reproduction can be achieved if a color mapping is applied to the input image signal extending the EBU gamut to the wide gamut before driving the wide gamut primaries. However, the known color mappings, which typically implement a saturation increase, still cause a non-optimal color reproduction on the wide gamut displays.

Similarly, if EBU content has to be displayed on a display with color primaries which provide a gamut smaller than the EBU gamut, or if a wide gamut content has to be displayed on a display with an EBU gamut, the color mapping has to shrink the input gamut to a smaller display gamut, and again the color reproduction will be impaired.

SUMMARY OF THE INVENTION

It is an object of the invention to improve the color reproduction of a display which has color primaries spanning a gamut different than the gamut of the input signal.

A first aspect of the invention provides a color mapping method as claimed in claim 1. A second aspect of the invention provides a color mapping circuit as claimed in claim 13. A third aspect of the invention provides a display as claimed in claim 14. A fourth aspect of the invention provides a computer program product as claimed in claim 18. Advantageous embodiments are defined in the dependent claims.

The color mapping method in accordance with the first aspect of the invention maps an input image signal into an output image signal for a display which comprises display pixels having sub-pixels with primary colors defining a display color gamut which covers all colors which can be displayed by the display. Let it be assumed that the number of sub-pixels and thus the number of primary colors and the colors of the primary colors are selected to obtain a display gamut larger than the input gamut of the input signal. One typical artifact on such wide gamut displays is that it seems as if some saturated colors are fluorescent. Or said differently, some saturated colors appear brighter than what viewers expect based on the content of the image. For a display with a display gamut smaller than the input gamut, a typical artifact is that some saturated colors have a too low luminance and look dull, i.e. again the luminance is uncontrolledly incorrect. Alternatively, the colors of the three primaries may be selected differently.

In the real world, people see objects because they reflect light from a light source towards the red, green and blue cones on the retina of the eye. The CIE 1931 xy-chromaticity coordinates can be calculated by using the color matching functions to match the color of the spectrum of the reflected light. These xy-chromaticity coordinates give an indication of the color that a (standard) observer will see. If an object in a scene reflects 100% of the light and the light source has a flat (or a relatively flat) spectrum a white object is seen. This object has the highest brightness of all reflecting objects illuminated by this light source. Another object that reflects a very narrow spectral band at, for example, 630 nm has a very saturated red color, and thus absorbs all light outside the narrow band around 630 nm. Consequently, when illuminated by the same wide spectrum light source, the brightness of this red object must be much lower than the brightness of the white object.

In order to estimate a maximum (e.g. a typical highest naturally occurring, or mathematically highest possible) luminance of reflective spectra of objects which have different colors, the luminances of the reflective spectra of (real world) objects having a color corresponding to a particular chromaticity (so e.g. a coca cola red color, as it could be generated by a theoretical or actual color filter, such as a paint) are determined at different chromaticities within the display color gamut. The reflective spectra are the spectra of reflective objects which have a substantial maximum reflectivity at the different chromaticities. Said more accurately, a reflective spectrum of such a real world object is a spectrum of the light reflected by the real world object. The luminance of this spectrum is the target for the luminance generated by the display at the chromaticity corresponding to the color of the real world object. For example, the maximum luminances of the reflective spectra of a large set of spectral band-pass filters may be used with different widths and center frequencies. For each filter the xy-chromaticity coordinate and the relative luminance is calculated for e.g. a light source with a flat spectrum, or daylight spectrum. Thus, said differently, it can be determined for each color or chromaticity coordinate within the display color gamut what the relative luminance of this color with respect to the luminance of white is. It is not required to store the relative luminance for each color. The relative luminance may be stored for a set of colors, and the luminance of the actual color can be interpolated from the stored set (interesting when using characteristic natural colors, e.g. maximally bright leave green). It has to be noted that the determination of the luminances of reflective spectra at different chromaticities as such is known from the publication "Maximum Visual Efficiency of Colored Materials", by David L. MacAdam, in J.O.S.A, volume 25, 1935, pages 361 to 367.

To avoid the unrealistic fluorescence or the dullness artifact, the display has to be more accurately calibrated than according to past principles.

The color mapping method uses the luminances of the above discussed reflective spectra at different chromaticities within the display color gamut. These desired luminances are e.g. stored in a look-up table, or modeled with a function such as e.g. a two-dimensional polynomial, approximating the hull (the color mountain) of maximally reflecting/luminous colors. The two-dimensional polynomial may be a paraboloid. Alternatively, a two-dimensional Gaussian function may be used. It has to be noted that instead of the measured desired luminances, theoretical determined desired luminances may be used such as for example the Schrodinger curves. It is even possible to use a combination (for example an average) of the measured and theoretic desired luminances.

The color mapping method comprises a gamut mapping which maps the input image signal which has input pixel colors defined by an input luminance and an input chromaticity into a mapped image signal which has corresponding mapped pixel colors defined by a mapped luminance and a mapped chromaticity. The input pixel colors lie within the input color gamut different than the display color gamut. The desired luminance may be retrieved by looking up stored desired luminance values in a look-up table at the mapped chromaticity, or by calculating a relative to white luminance, or a luminance decrease, etc. There is some allowable tolerance until a color becomes annoyingly luminous, and especially in the direction towards dark, an even larger tolerance is possible.

A factor is determined dependent on a difference between the desired luminance and the mapped luminance. The mapped luminance (obtained from e.g. a basic colorimetric transformation or prior art gamut mapping) is adapted by using the factor to obtain an output luminance nearer to the desired luminance than the mapped luminance. The image output signal is defined by the mapped chromaticity and the output luminance. Of course the skilled person will realize that what is conceptually described as a two step process can in practice be realized as a single mapping transformation.

It has to be noted that the present invention does not emulated a display, but uses desired luminances of the light reflected by a set of real world objects, wherein each one of the objects has a color corresponding to a particular chromaticity in the gamut of the display. If required, the luminance obtained after the mapping is corrected to be near to the desired luminance. Consequently, the resulting displayed image will look naturally because each color is displayed with a luminance corresponding to that of a real world object having the corresponding color.

In an embodiment, the desired luminances are stored in a look-up table, and in another embodiment a mathematical model is used to generate the desired luminances. These generated desired luminances may be stored for later use.

In an embodiment, the spectrum of the light reflected by the real world object is obtained by illuminating the real world object with a predefined light source which, for example, is a wide spectrum light source which at least covers the visible range of light.

In an embodiment, the mapped luminance is clipped to substantially the stored luminance. Thus, the too bright colors are prevented by changing the drive signals for the display primaries such that the luminance substantially matches the luminance of a real reflective object which has the same color.

More sophisticated embodiments may apply further corrections, e.g. by looking up other luminances or factors stored for the present chromaticity (e.g. of neighboring colors), or looking at the actually obtained luminances of colors adjacent in the image, so retain/emphasize local image structure (by applying small further luminance decreases), but that is beyond the core principle of the present invention.

In an embodiment, the color mapping method retrieves a further looked-up luminance by looking up the stored luminance in the look-up table at the input chromaticity of the input signal. The mapped luminance is scaled by a factor which is substantially equal to a ratio of the looked-up luminance at the mapped chromaticity and the looked-up luminance at the input chromaticity. This scaling has the advantage that artifacts caused by clipping are prevented.

In an embodiment, the gamut mapping only applies a gamut mapping to the input chromaticity. Thus, the mapped luminance is the input luminance. Such a gamut mapping only changes the chromaticity from the input gamut into the different display gamut and does not influence the luminance.

In an embodiment, the gamut mapping provides a color enhancement which, for example is a saturation boost in a wide gamut display which has more than three primary colors.

In an embodiment, a display in which the color mapping method is applied is optimized to improve the color reproduction. The color mapping of the present invention may be inside of and define the color behavior of the display, or may be applied in a separate apparatus, the display just obtaining corrected input signals. The color mapping method may be combined with such a display to further decrease any mismatch between the luminance of displayed colors and the luminance of the real world reflective objects which have the same color. Such an optimized display may be designed in accordance with the following design method. The display has pixels of which a pixel color is obtained by mixing of at least four primary colors. These primary colors define the display color gamut of the display. Thus, the display color gamut covers all colors which can be displayed by the display. However, these primary colors have to fulfill special requirements to avoid the fluorescence or dullness artifacts in the color reproduction.

To avoid the fluorescence artifact or the dullness artifact, the at least four primary colors may be selected to obtain a luminance of the pixel colors generated already being closer to the natural/maximal colors (before applying further algorithmic correction).

These and other aspects of the invention are apparent from and will be elucidated with reference to the embodiments described hereinafter.

It should be noted that items which have the same reference numbers in different Figures, have the same structural features and the same functions, or are the same signals. Where the function and/or structure of such an item has been explained, there is no necessity for repeated explanation thereof in the detailed description.

DETAILED DESCRIPTION

Figure 1:
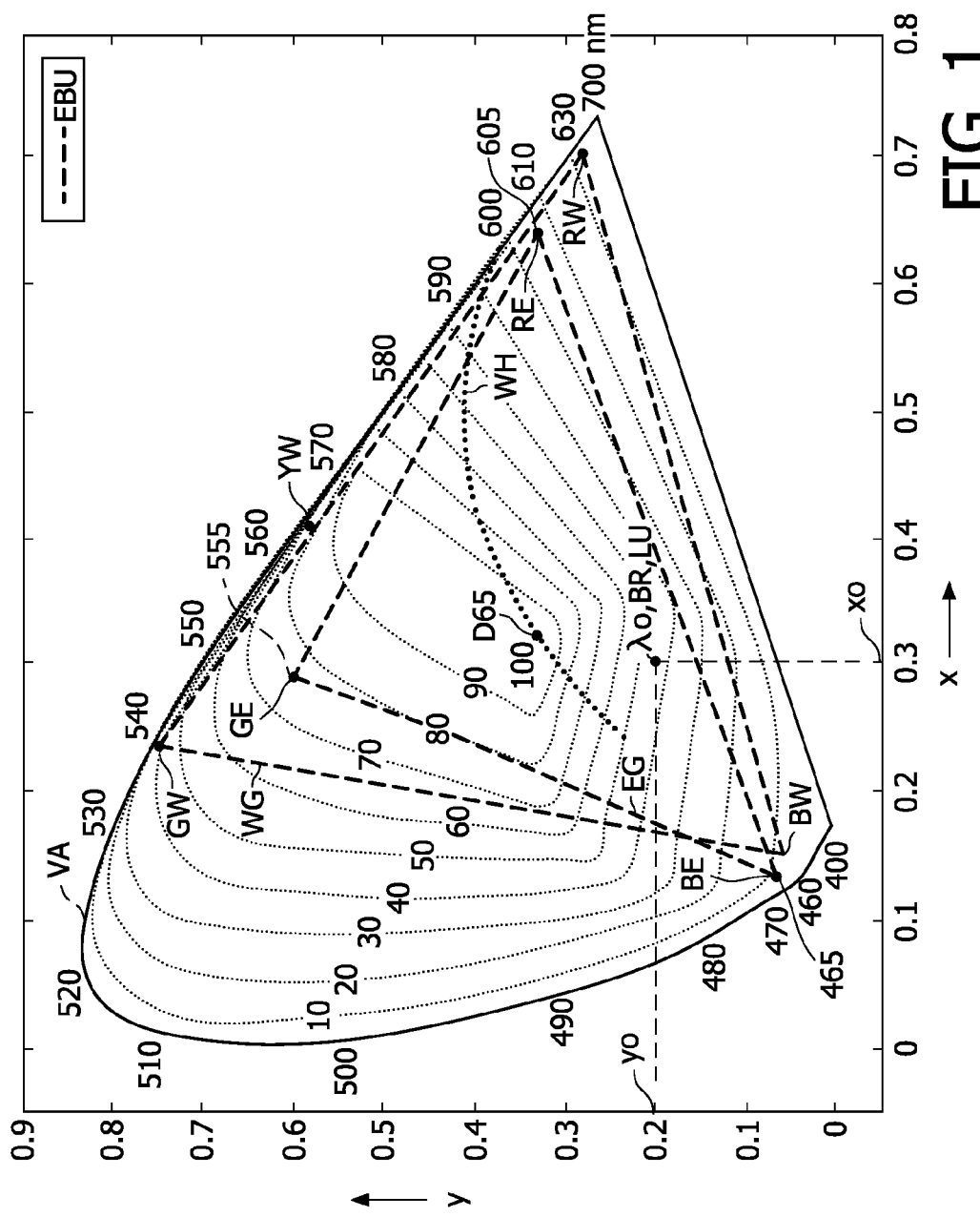
FIG. 1 schematically shows equal luminance loci of the reflective spectra in the "horse shoe" visible color space of the xy-chromaticity plane.

FIG. 1 schematically shows equal luminance loci of the reflective spectra in the "horse shoe" visible color space of the xy-chromaticity plane. The CIE 1931 x chromaticity coordinate is depicted along the horizontal axis, and the CIE 1931 y chromaticity coordinate is depicted along the vertical axis. The "horse shoe" locus VA indicates the boundary of visible colors. Colors with xy chromaticity coordinates on the locus VA are the 100% saturated colors which are also referred to as the monochromatic colors because the spectra of these colors comprise only a single wavelength. The numbers along the locus VA indicate the wavelength in nm. With the EBU primaries red RE, green GE and blue BE all the colors with xy chromaticity coordinates within the triangle EG of which the primaries RE, GE, BE are the vertices can be displayed. The white colors have xy chromaticity coordinates which lie on the curve WH. For example, white D65 is indicated.

As is well known from displays which use the EBU primaries RE, GE, BE, a particular ratio of these primaries is required to obtain the desired white point which should be displayed if the input signal components Ri, Gi, Bi (see FIG. 6) all have their maximum value. Usually, the maximum value of these input signal components Ri, Gi, Bi is equal and is a voltage level, for example 0.7V, for analog signals, or a number, for example 255 for 8 bit digital signals. In the now following, signals have normalized values in the range starting at zero and ending at one. Thus, if the input signal components Ri, Gi, Bi are all 1, the primaries RE, GE, BE should have a ratio such that the desired white point is displayed (and a display is calibrated according to classical principles to show the desired white point and color cast, but this also fixes the behavior of the other colors). For example, it is assumed that the desired white point is D65 (x=0.3127, y=0.3290) and the chromaticity coordinates of the primaries are: for red RE: x=0.64, y=0.33, for green GE: x=0.29, y=0.60, and for blue BE: x=0.15, y=0.06. Now, it can be calculated that the luminances for the red, green, and blue colors of the display should have a ratio of 22, 71 and 7. However, in many displays a more bluish white point is used, for example with a luminance ratio for red, green, blue of 20:70:10.

FIG. 1 further shows an example of a wide gamut display defined by the primaries RW, GW, BW. The colors, which can be displayed by this wide gamut display, are defined by the triangle WG of which the vertices are formed by the RW, GW, BW primaries.

Figure 2:
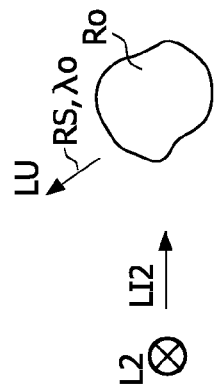
FIG. 2 shows a light source which illuminates an object.

An example of how the equal luminance loci of the reflective spectra may be defined in the xy chromaticity space is elucidated in the now following with respect to FIG. 2. In an ideal setup, a very high number of objects RO are illuminated by a light source L2 that provides a wide spectrum LI2. In this example, the spectrum is that of a standard illuminant D65 (which is the daylight spectrum with a corresponding color temperature of 6500K). In an exemplary optimal colors natural luminance realization, the different objects RO have a substantially 100% reflectivity for several wavelengths or a zero reflectivity for other wavelengths. Thus, for a (near) monochromatic color the corresponding object RO has a substantially 100% (or relatively high) reflectivity at a particular wavelength and a substantially zero (or relatively low) reflection at other wavelengths. And, at the other end of the scale, the brightest white object has a substantially 100% reflectivity over the complete visual range of wavelengths. For intermediate colors, the objects may have a high reflectivity over a relatively small area of wavelengths. Such intermediate colors may, for example, be represented by a band-pass reflective filter centered on a particular wavelength, or by two or more band-pass reflective filters centered on two or more different center frequencies, respectively. It has to be noted that objects can have different spectra, but the same chromaticity xy. Some of those objects will reflect more light than others and will therefore have a higher luminance. FIG. 1 shows the maximum luminance that a reflective object with a particular chromaticity xy may have. The maximal reflectivity example above being only a practically easy way to obtain maximally reflecting object spectra, one could also e.g. derive such spectra on the basic of real spectra from nature (e.g. one looks for the brightest red objects, brightest typical greens, which are mostly foliage, etc.). Having this data, one can derive a set of maximal luminances for all chromaticities, which can be stored in a memory (LUT) or can further be modeled mathematically (e.g. one can approximate this hull with polynomials, or exponentials, etc.).

For each one of the objects RO the luminance LU of the reflected light is measured. From these measurements it is possible to construct the equal luminance loci shown in FIG. 1. These equal luminance loci are indicated by a number which shows the relative luminance. In the example shown, the luminance of the white object which reflects all light is set to 100% which is indicated by 100. The locus indicated by 90 shows all colored objects which have a luminance of their reflective spectra which is 90% of the luminance of the white object. The determination of the luminances of reflective spectra at different chromaticities as such is known from the publication "Maximum Visual Efficiency of Colored Materials", by David L. MacAdam, in J.O.S.A, volume 25, 1935, pages 361 to 367. It has to be noted that if another white color is selected with another spectrum Ll2, the maximum luminance for the same reflective object may be different and thus the equal luminance loci shown in FIG. 1 may differ.

Now returning to FIG. 1, these equal luminance loci are used to compare the relative brightness BR of a color displayed on the display with the luminance LU of a reflective spectrum of an object RO which has the same color. From FIG. 1 it is clear that the luminance of the reflective objects RO which have the same color as the primaries RE, GE, BE, respectively, is 22, 77 and 8, respectively. It has to be noted that for the EBU primaries RE, GE, BE to produce white D65, the luminance ratios are defined by r:g:b=22:71:7. Thus, if the total luminance of white D65 is normalized to 100, the normalized maximum luminance of the red, green and blue components are respectively 22, 71 and 7. In the now following, the normalized maximum luminance is also referred to as the maximum luminance, luminance factor, or even just luminance if is clear from the context that the normalized maximum luminance is meant. In literature, the luminance factor is also referred to as lightness.

This means that when the input signal Ri component is 1, the red primary has a luminance of 22. The luminance of the object RO which has the same color as the red primary RE is also 22. When the input signal Gi component is 1, the green primary has a luminance of 71. On the other hand, the luminance of the object RO which has the same color as the green primary GE is 77. When the input signal Bi component is 1, the blue primary has a luminance of 7. On the other hand, the luminance LU of the object which has the same color as the blue primary BE is 8. Thus, for this selection of the primaries the luminance of the primary colors substantially matches the corresponding luminances LU. In order to get a good match between the display gamut and the reflective colors gamut it must be checked that also at other colors the display luminance matches with the corresponding luminances LU. For example, the luminance of the yellow color which occurs when both the input signal Ri and Gi have the value 1 is 93=22+71, while the reflective luminance at this color is 97.

In the same manner it can be shown that a wide-gamut display with the three primaries RW, GW, BW has a non-matching luminance, especially for green and red colors. The ratio of the luminances of the red, green, and blue primaries for white D65 is 26:68:7. The luminance of the reflective objects RO which have the same color as the primaries RW, GW, BW, is 12, 31, 7 respectively. Thus, a mismatch between the luminance of the primary RW and GW and the luminance LU of the correspondingly colored object RO exists of about a factor of two for the red color if only the red primary RW produces light, and about also a factor of two for the green color if only the green primary GW produces light. The luminance of the red and green primaries RW, GW is too high compared to that of reflective colors with the same saturation. This creates for these colors an undesirable impression that the displayed object is fluorescent when the same drive signals are used as for a normal gamut display with three primaries.

It was realized that it is possible to decrease the contribution of one or more primaries by adding at least a further primary. This is illustrated with two examples. The first example shows the effect if a white primary W is added, and the second example shows the effect of adding a yellow primary YW. Alternatively, only three primaries may be selected with colors selected such that a smaller mismatch occurs than with the wide gamut primaries RW, GW, BW shown in FIG. 1.

In an RGBW display in which the EBU primaries R, G, B are used for RGB (red, green and blue), and white D65 for the white primary, white D65 is obtained by the associated luminance ratio of the red, green, blue, and white primaries of 11, 35, 4, 50, respectively. These luminance values 11, 35, 4 should be compared with the luminances 22, 77, 8 of the objects RO having the same colors as the EBU primaries R, G, B, respectively. It is clear that at this selection of the primaries for RGB a high mismatch results between the luminance values of the primaries R, G, B and the luminances LU of the reflective spectra of the corresponding objects RO. In this example, the luminance is too low, which causes a too dark and thus dull impression for saturated colors.

In an RGBW display in which the wide primaries RW, GW, BW are used for RGB (red, green and blue), and white D65 is used for the added white primary W, white D65 is obtained by the associated luminance ratio of r, g, b, w of 11, 35, 4, 50, respectively. These luminance values 11, 35, 4 should be compared with the luminances 12, 31, 7 of the objects RO having the same colors as the primaries RW, GW, BW, respectively. It is clear that at this selection of the primaries for RGB provides a substantial better match between the luminance values of the primaries RW, GW, BW and the luminances LU of the reflective spectra of the corresponding objects RO. However, for the for the secondary color yellow, for which the primaries RW and GW are active the luminance value is 11+35=46, while can be found in FIG. 1 that the luminance LU of the reflective object RO which the same yellow color is approximately 91. For the secondary color magenta, the luminance factor is 11+4=15 and the luminance is 19. For the secondary color cyan, the luminance factor is 35+4=39 and the luminance is 50. Thus, for yellow colors, still a substantial mismatch is present.

It has to be noted that secondary colors are colors between two primaries, thus colors which are realized by using two primaries only.

Now another example is explained wherein a RGBY display is provided in which the EBU primaries R, G, B are used for RGB and a yellow primary YW is added. The ratio of the primary colors R, G, B, YW to obtain white D65 is now 11:35:7:47. These luminance values 11, 35, 7 should be compared with the luminances 22, 7, 8 of the objects RO having the same colors as the primaries R, G, B, respectively. It is clear that at this selection of the primaries for RGB a high mismatch results between the luminance values of the primaries R and G and the luminances LU of the reflective spectra of the corresponding objects RO. Also in this example, the luminance is too low, which causes a too dark impression for saturated colors.

If the RGBY display is based on the wide primaries RW, GW, BW to which the yellow primary is added, the situation improves considerably. For a good match between the display gamut and the reflective colors gamut at the primary colors the luminance ratio of the primaries r, g, b, y is 13, 34, 7, 47, respectively. These luminance values 13, 34, 7 should be compared with the luminances 12, 31, 7 of the objects RO having the same colors as the primaries RW, GW, BW, respectively. It is clear that at this selection of the primaries for RGB a substantial match results between the luminance values of the primaries RW, GW, BW and the luminances LU of the reflective spectra of the corresponding objects RO. Also, for the secondary color yellow, for which the primaries RW, GW and YW are active the luminance is 13+34+47=94, while can be found in FIG. 1 that the luminance LU of the reflective object RO which the same yellow color is approximately 91. Thus now, a substantial match between the luminance of the yellow color and the corresponding luminance of the reflective yellow object is obtained. For the secondary color magenta, the luminance value is 13+7=20 and the luminance factor is 19. For the secondary color cyan, the luminance value is 34+7=41 and the luminance factor is 50. Thus, a substantial match is present for all primary and secondary colors. Consequently, a substantial match is obtained for all the colors within the wide gamut.

As is clear from the examples shown, dependent on the selection of the primaries a relatively large mismatch may occur. This mismatch can be decreased by dimming the driving of the primaries of the display. Even if primaries are found which provide a substantial match, still a relatively small deviation may exist. By combining the dimming of the driving with these relatively good matching primaries the color reproduction of the display can be further improved. Embodiments of dimming the driving of the primaries of the display are elucidated with respect to FIGS. 3 to 5.

FIG. 2 shows a light source which illuminates an object. The wide-spectrum light source L2 produces light LI2 with a wide spectrum to illuminate the reflective object RO. The object RO has a high reflectivity for a particular wavelength or set of wavelengths. The reflected light has a spectrum RS, which corresponds to a chromaticity λ0 and luminance LU. This spectrum is also referred to as the reflective spectrum. Because FIG. 2 has already been explained in the description of FIG. 1 no further elucidation is provided here.

Figure 3:
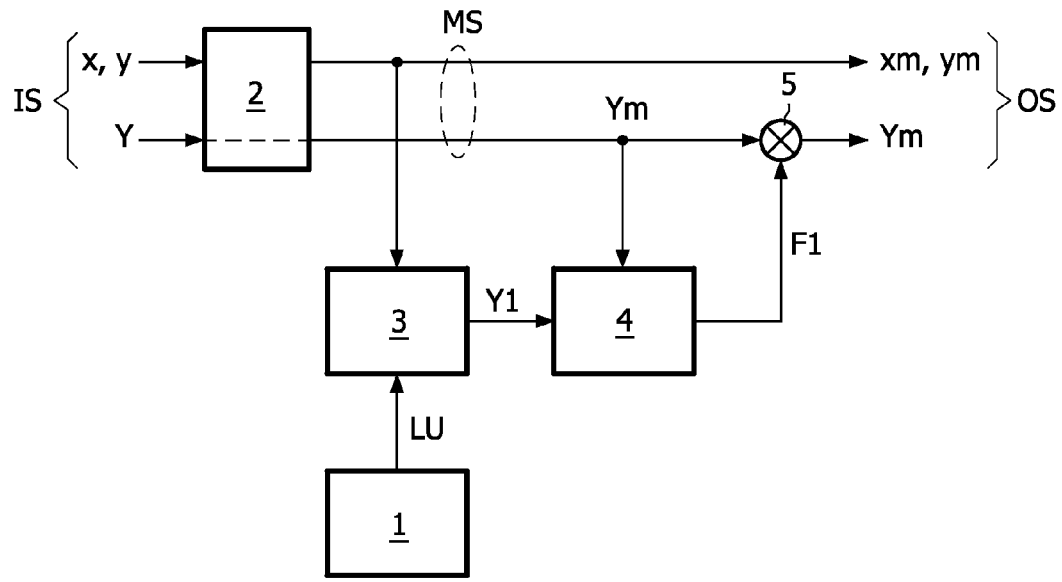
FIG. 3 shows a block diagram of an embodiment of the color mapping circuit.

FIG. 3 shows a block diagram of an embodiment of the color mapping circuit. The input image signal IS defines an input image composed by input pixels which have input pixel colors. Although the invention will be explained with respect to an input image signal defined in the CIE 1931 x,y color space, the present invention should not be limited to this x,y color space only, and can be applied in any other color space in which the luminance and the chromaticity is defined or can be determined. Examples of such color spaces are the CIE 1976 u'v' color space and the video color space YCrCb. It is even possible to apply the present invention in an RGB color space, but this will be more complicated because the chromaticity and the luminance have to be calculated from the RGB components. If the input image signal is coded in the RGB color space, and the extra calculations for determining the chromaticity and the luminance are not desired, the input image signal should be transformed from the gamma RGB domain to a linear light domain such as for example the xyY space.

The input pixel colors are defined by an input luminance Y and an input chromaticity x, y. The input pixel colors are restricted to an input color gamut. The gamut mapper 2 applies a mapping or transformation to the input image signal IS such that a mapped image signal MS results with a mapped gamut which is different than the input gamut. The mapped image signal MS has chromaticities xm, ym. The difference between the mapped gamut and the input gamut may cause the too high luminance of the primaries if the input gamut is extended, or a too low luminance of the primaries if the mapped gamut is smaller than the input gamut.

Usually, the gamut mapper 2 processes the input image signal IS to obtain the mapped image signal MS which is enhanced with respect the input image signal IS. For example, the gamut mapper 2 may be any color transform which may have influence on the luminance Y and the chromaticity x,y (for example, a three-dimensional matrixing) or may be a color transform which operates on the chromaticity coordinates x,y only (for example a luminance retraining saturation stretching gamut mapping). In the last mentioned situation, the mapped luminance Ym is identical to the input luminance Y. Or said differently, the input luminance Y is not processed by the gamut mapper 2.

The invention can be used in any type of display which has a display gamut different from the input gamut. For example, for EBU coded signals, the display can be a wide gamut (larger than the EBU gamut) LCD. Alternatively, the display can have a gamut smaller than the EBU gamut, for example for a LCD of a mobile apparatus, or in future when input signals coded on wide primaries will have to be displayed on a display apparatus with a smaller gamut defined by the EBU primaries. A full color display may have 3 or more primaries.

The look-up circuit 3 receives the mapped chromaticity xm, ym and looks-up the corresponding luminance LU in the look-up table (further also referred to as LUT) 1. The looked-up luminance corresponding to the mapped chromaticity xm, ym is referred to as Y1. This luminance Y1 is the maximum luminance LU of the reflective object RO which has a color corresponding to the mapped chromaticity xm, ym.

The factor determining circuit 4 receives the mapped luminance Ym and the looked-up luminance Y1 to determine a factor F1 which indicates the difference between the mapped luminance Ym and the looked-up luminance Y1. The luminance adapting circuit 5 receives the mapped luminance Ym and the factor F1 to supply the output luminance Ys. The luminance adapting circuit 5 adapts the mapped luminance Ym by using the factor F to obtain an output luminance Ys nearer to the looked-up luminance Y1 than the mapped luminance Ym. For example, the luminance adapting circuit 5 is a gain multiplier or scaler which multiplies the mapped luminance Ym with the factor F1. The factor F1 may be selected such that the output luminance Ys is clipped to the looked-up luminance Y1. Alternatively, the factor F1 may be the ratio of a portion of this ratio of the mapped luminance Ym and the looked-up luminance Y1. The color reproduction in the output image signal OS is optimal if for the mapped chromaticity xm, ym the luminance Ys does not deviate substantially from the luminance Y1. Consequently, the gamut mapper 2 is able to enhance the input image signal IS, for example by applying a color stretching, without causing some colors in the output image signal OS to be much too bright or dull. It has to be noted that the mapped luminance Ym may be the input luminance Y if the mapper 2 does not act on or does not change the input luminance Y. The above hardware or software block description describing only a simple realization, the skilled person will understand how a luminance adapting circuit can incorporate its own evaluation unit, for calculating the mathematical model to obtain a desirable luminance for an input mapped chromaticity.

Figure 4:
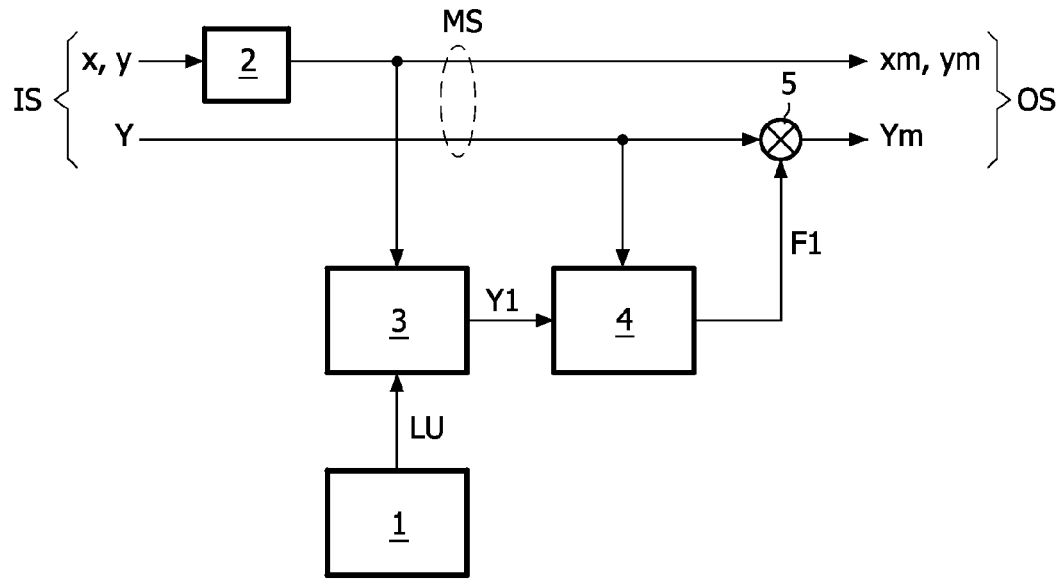
FIG. 4 shows a block diagram of another embodiment of the color mapping circuit.

FIG. 4 shows a block diagram of another embodiment of the color mapping circuit. This color mapping circuit is based on the circuit shown in FIG. 3, the only difference is that the gamut mapper 2 does not influence the input luminance Y and thus the mapped luminance Ym is identical to the input luminance Y. Only the chromaticity x,y is mapped. The operation of this circuit is identical to the circuit described with respect to FIG. 3.

Figure 5:
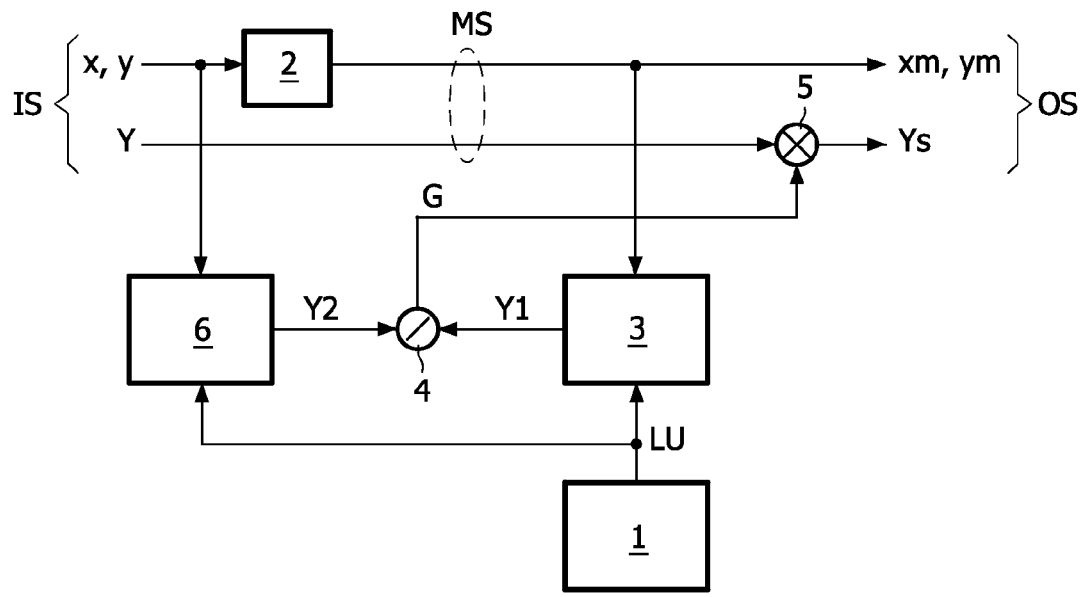
FIG. 5 shows a block diagram of yet another embodiment of the color mapping circuit, FIG. 6 schematically shows a display apparatus with an LCD and a backlight, FIG. 7 schematically shows a display apparatus with a DMD and a color wheel.

FIG. 5 shows a block diagram of yet another embodiment of the color mapping circuit. This color mapping circuit is based on the circuit shown in FIG. 4. The differences are that a look-up circuit 6 is added, the factor determining circuit 4 now determines a ratio, and the luminance adapting circuit 5 is a gain multiplier. The look-up circuit 6 receives the input chromaticity x, y and looks-up the corresponding luminance LU in the LUT 1. The looked-up luminance corresponding to the input chromaticity x, y is referred to as Y2. This luminance Y2 is the maximum luminance LU of the reflective object RO which has a color corresponding to the input chromaticity x, y. The factor determining circuit 4 determines the ratio of the luminances Y2 and Y1 of the input chrominance x, y and the corresponding mapped chrominance xm, ym, respectively to obtain the factor G=Y2/Y1. The gain multiplier 5 multiplies the input luminance Y with the factor G to obtain the output luminance Ys.

The color mapping may be combined with a display which is optimized for natural color reproduction. Such displays are described with respect to FIGS. 8 to 11. The color mapping may be used in a LCD (liquid crystal display) apparatus as described with respect to FIG. 6, or a DMD (digital mirror display) apparatus as described with respect to FIG. 7.

Figure 6:
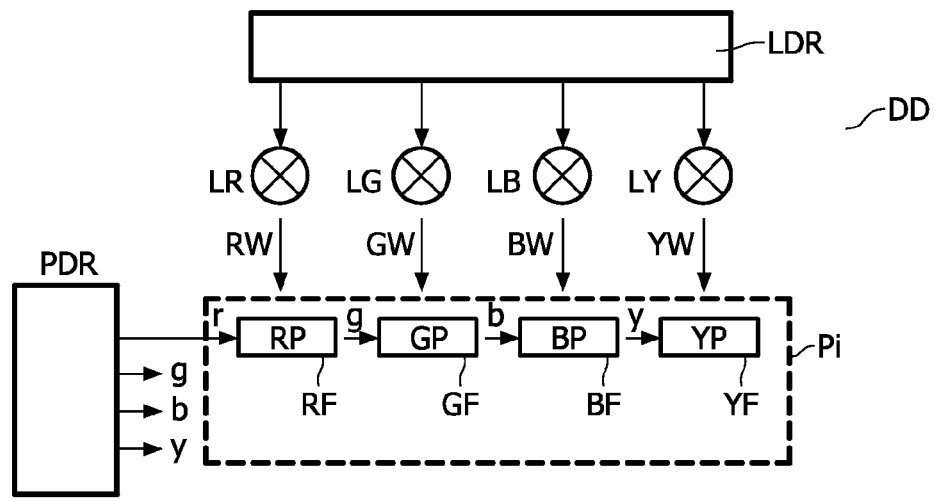
Figure 7:
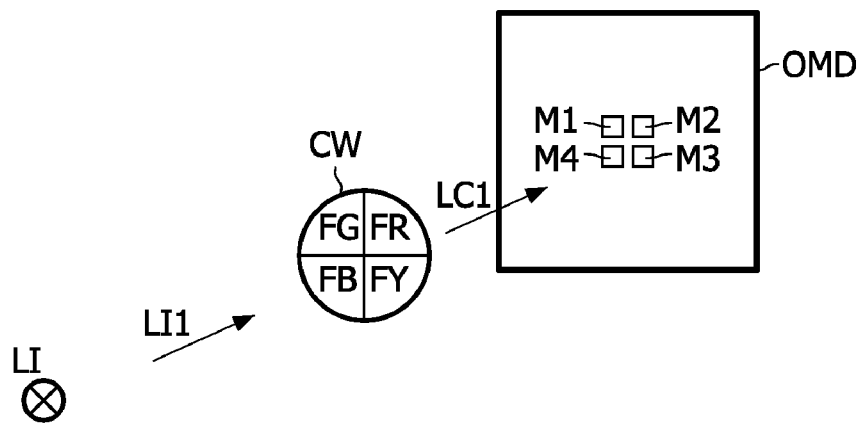

FIG. 6 schematically shows a LC display apparatus. In the embodiment shown, the pixel Pi comprises four LC sub-pixels RP, GP, BP, YP. Color filters RF, GF, BF, YF are associated with the sub-pixels RP, GP, BP, YP. The color filters RF, GF, BF, YF may be present at the other side of the sub-pixels RP, GP, BP, YP, thus in between the light sources LR, LG, LB, LY and the sub-pixels RP, GP, BP, YP. Not all sub-pixels RP, GP, BP, YP must have a color filter. In the embodiment shown, four light sources LR, LG, LB, LY are present which are driven by the driver LDR and which define together with the color filters RF, GF, BF, YF the primary colors RW, GW, BW, YW of the display apparatus DD. In FIG. 7 the colors of the light generated by the light sources LR, LG, LB, LY are matched with the associated filters RF, GF, BF, YF and are not changed in their ratios by the filters RF, GF, BF, YF. Or said differently, the color filters are only required to block the light of the not associated light sources. Now the light leaving the light sources LR, LG, LB, LY are the primaries of the display DD.

Instead of the four different light sources LR, LG, LB, LY only three light sources may be present. Now, one of the color filters RF, GF, BF, YF is selected to pass at least some light of at least two of the light sources LR, LG, LB, LY. Alternatively, a single light source of a set of light sources which all emit substantially the same spectrum may be used. In this embodiment, the primaries are defined by the spectral distribution of the light of the light source and the spectral filtering of the color filters.

A pixel driver PDR supplies the drive signals r, g, b, y to the sub-pixels RP, GP, BP, YP, respectively to control a transmission of the sub-pixels RP, GP, BP, YP.

It has to be noted that if more than four primaries are required, more than four sub-pixels per pixels are required. Dependent on how the primaries are obtained more differently colored light sources and/or color filters will be required. Although the R, G, B, Y refers to red, green, blue and yellow, actually other colors may be used.

FIG. 7 schematically shows a display apparatus with a DMD and a color wheel. A wide-spectrum light source L1 generates a light beam LI1 which impinges on a rotating color wheel CW. The color wheel CW has color filter segments FG, FR, FB, FY. The light beam LC1 which leaves the color wheel CW time sequentially impinges on the sub-pixels M1, M2, M3, M4 of the pixel Pi of the DMD display. All the sub-pixels M1 to M4 may be identical mini mirrors of which an angle is modulated in accordance with an image to be displayed.

Figure 8:
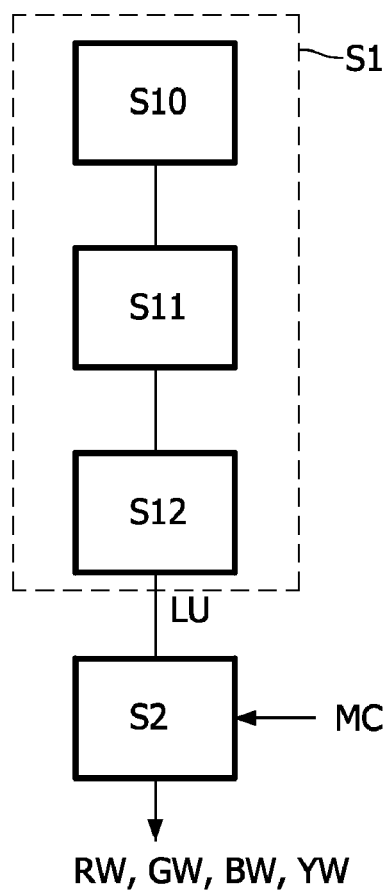
FIG. 8 shows a high level flowchart of the method of designing a display with optimally selected primaries with respect to color reproduction.

FIG. 8 shows a high level flowchart of a method of further designing a display. In step S1, the luminances LU of the objects RO are determined. Usually, these luminances LU for differently colored objects RO are determined once and then stored in a table. Alternatively, these luminances LU may be found in literature and can be used immediately in step S2. In step S2 the primaries RW, GW, BW, YW are selected such that the maximum luminance BR of different colors reproducible with the gamut defined by the primaries RW, GW, BW, YW substantially match the luminances LU of the spectra reflected by objects RO having the corresponding colors. If for the display design a different white point of the maximum luminance is preferred, then a different spectrum of the light source LI2 has to be taken. For example, for a D65 white point the corresponding daylight spectrum D65 is taken for LI2. For a 8600K white point the corresponding blackbody radiator spectrum with a temperature of 8600K is taken.

If the luminances LU have to be determined, in step S10, the reflective objects RO are illuminated with the light LI2 generated by the wide-band light source L2. In step S11, the luminances LU of the reflective spectra reflected by reflective objects RO, which have a reflection of substantially 100% at various wavelengths, are measured, and the corresponding chromaticity λ0 and luminance LU are calculated. In step S12, the determined luminances LU are stored for use. Alternatively, if already known, the luminances LU may be stored directly and the steps S10 and S11 are not required.

Figure 9:
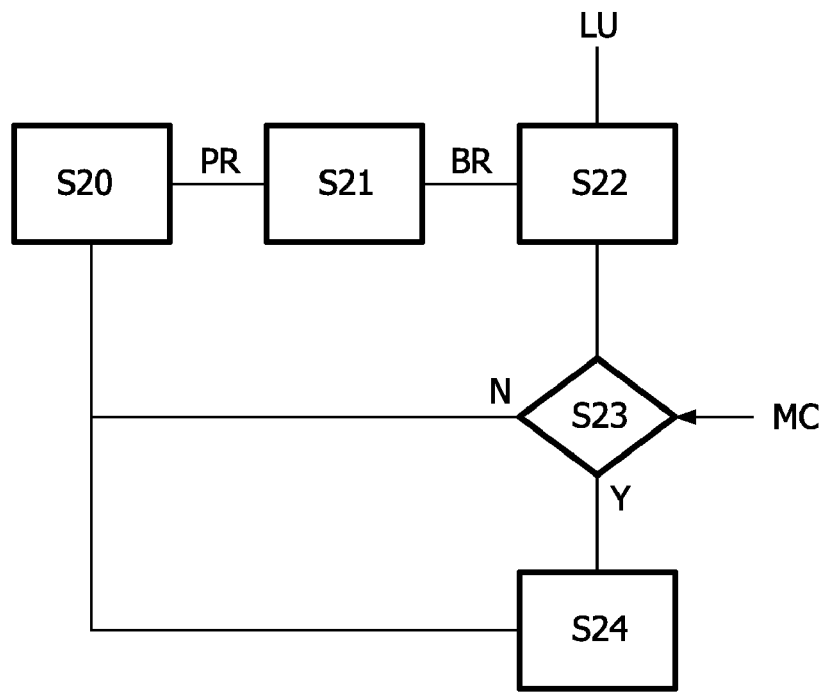
FIG. 9 shows a flowchart of an embodiment of the method of designing a display.

FIG. 9 shows a flowchart of an embodiment of the method of designing a display. In this embodiment, the step S2 operates as follows. First, in step S20 a set of primaries RW, GW, BW, YW and the desired white point are selected. The selected primaries RW, GW, BW, YW and the selected white point are collectively also referred to by PR. The ratio of the selected primaries RW, GW, BW, YW to obtain the desired white point is calculated in step S21. Next, also in step S21, the maximum luminance BR is calculated for all primary colors RW, GW, BW, YW and all secondary colors. The secondary colors are the colors resulting from mixing the primary colors RW, GW, BW, YW which have the maximum luminance BR. The luminances LU of the reflective objects corresponding to the primary colors RW, GW, BW, YW and the secondary colors are determined or retrieved from the storage medium.

The calculated luminance values BR are compared with the corresponding luminances LU in step S22. Finally, in step S23 a decision is taken whether the luminance values BR substantially match the luminances LU according to the matching criteria MC. If a set of selected primaries RW, GW, BW, YW does not fulfill the matching criteria MC, the algorithm proceeds to step S20 and selects another set of primaries RW, GW, BW, YW. If a set of selected primaries RW, GW, BW, YW fulfills the matching criteria MC this set is a candidate to be implemented in a display and is stored in step S24.

The algorithm may stop once a matching set of primaries RW, GW, BW, YW is found. Alternatively, the algorithm may search for more than one or even all matching sets of primaries RW, GW, BW, YW. If more sets of matching primaries RW, GW, BW, YW are available it is possible to select the set which has the best prospects in implementing it in a display. For example, an important consideration is the efficiency of the hardware required to obtain the matching primaries RW, GW, BW, YW. Alternatively, the best set may be the set with the largest gamut.

It has to be noted that instead of, or additional to, the primary colors and the secondary colors, other colors may be selected for which the associated luminance values BR are compared with the luminances LU. The colors selected should be realizable with the primaries RW, GW, BW, YW selected. Although four primaries RW, GW, BW, YW are referred to, the same algorithm can be applied on less or more than four primaries RW, GW, BW, YW. Further, although the four primaries use the letters R (red), G (green), B (blue) and Y (yellow), other colors may be selected for the primaries.

Examples of matching criteria may be: the luminance of the pixel color is within a range of 80 to 120 percent of the luminance LU of the object RO with the same color. The range may differ for different colors. Alternatively, as elucidated with respect to FIG. 11 an empirical approach may be used. Typically the errors have to be within +−10%.

Figure 10:
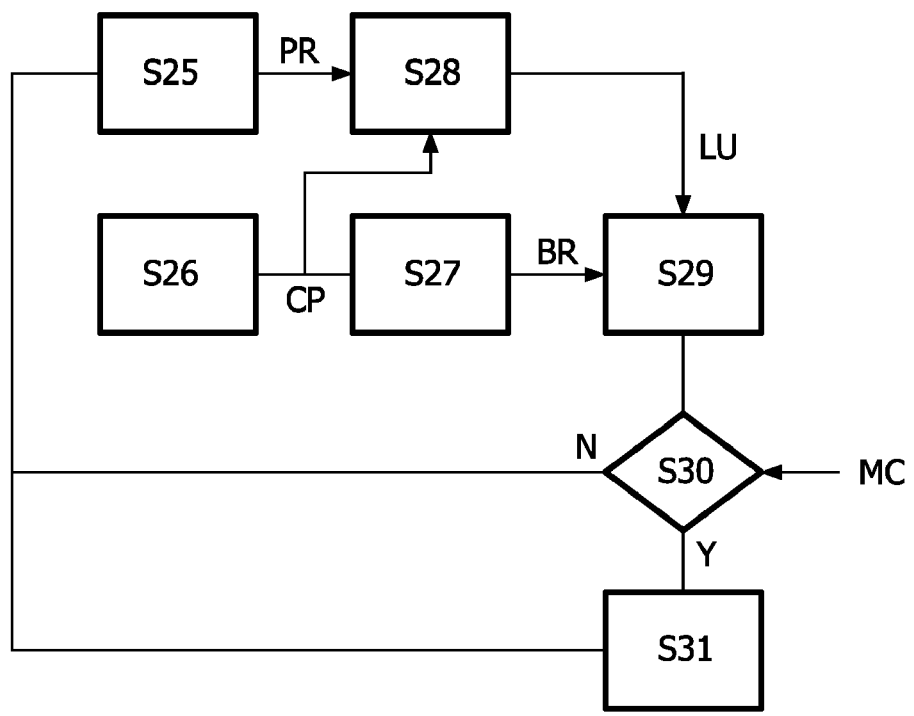
FIG. 10 shows a flowchart of an embodiment of the method of designing a display.

FIG. 10 shows a flowchart of an embodiment of the method of designing a display. In this embodiment, the step S2 operates as follows.

First, in step S25 a set of primaries RW, GW, BW, YW is selected. The selected primaries RW, GW, BW, YW are collectively also referred to by PR. In step S26, a set of check points CP is defined. These check points CP are colors within the display gamut at which the matching has to be checked. For example, the check points CP are the chromaticities of the red, green, and blue primaries (RW, GW, BW), the yellow, magenta, and cyan secundaries (RW+GW, RW+BW, GW+BW, respectively), and the preferred white point (e.g. D65).

In step S27 the corresponding luminances BR of the checkpoints CP are determined or retrieved from a storage medium. In step S28, the luminances LU of the reflective objects RO corresponding with the checkpoints CP are determined or retrieved from a storage medium. In step S29 the ratio between the luminances BR of the display primaries RW, GW, BW, YW is calculated.

In step S30 a decision is taken whether the luminance values BR substantially match the luminances LU according to the matching criteria MC. If a set of selected primaries RW, GW, BW, YW does not fulfill the matching criteria MC, the algorithm proceeds to step S25 and selects another set of primaries RW, GW, BW, YW. If a set of selected primaries RW, GW, BW, YW fulfills the matching criteria MC this set is a candidate to be implemented in a display and is stored in step S31. For each of the primaries RW, GW, BW, YW a range may be defined within these primaries may be selected.

The algorithm may stop once a matching set of primaries RW, GW, BW, YW is found. Alternatively, the algorithm may search for more than one or even all matching sets of primaries RW, GW, BW, YW. If more sets of matching primaries RW, GW, BW, YW are available it is possible to select the set which has the best prospects in implementing it in a display. For example, an important consideration is the efficiency of the hardware required to obtain the matching primaries RW, GW, BW, YW. Or the best set with respect to the size of the gamut, the larger the gamut the better. In an embodiment, the error of the display luminances BR and the reflective color luminances LU at the checkpoint chromaticities is minimized. This error mineralization is possible by selecting the optimal chromaticity of the primaries RW, GW, BW, YW within the allowed ranges, and/or by changing their luminances. The luminance of a primary can be changed by changing the spectrum of the backlight, or by changing the transmission spectrum of the color filter(s). The error may, for example, be defined as the root-mean-square error of the luminance difference, where the log 10 of each luminance is taken before calculating the difference. Typically, for a good display design, the error should be smaller than + and −10%.

It has to be noted that instead of, or additional to, the primary colors and the secondary colors, other colors may be selected for which the associated luminance values BR are compared with the luminances LU. The colors selected should be realizable with the primaries RW, GW, BW, YW selected. Although four primaries RW, GW, BW, YW are referred to, the same algorithm can be applied on less or more than four primaries RW, GW, BW, YW. Further, although the four primaries use the letters R (red), G (green), B (blue) and Y (yellow), other colors may be selected for the primaries.

Other examples of matching criteria may be: the luminance of the pixel color is within a range of 80 to 120 percent of the luminance LU of the object RO with the same color. The range may differ for different colors. Alternatively, as elucidated with respect to FIG. 11 an empirical approach may be used. Typically the errors are within +−10%.

Figure 11:
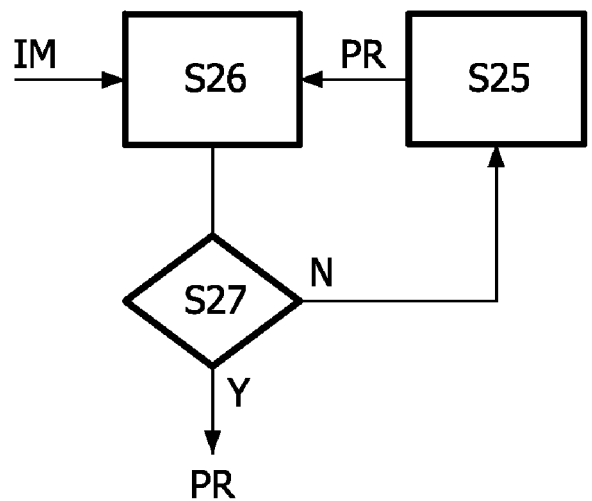
FIG. 11 shows a flowchart of an embodiment in accordance with the method of designing a display.

FIG. 11 shows a flowchart of an embodiment in accordance with the method of designing a display. In step S25 the primaries RW, GW, BW, YW are selected, for example, by an operator. The white point may be preset or may also be selectable by the operator. In step S26 the test images IM are displayed using the primaries RW, GW, BW, YW and the white point selected in step S25. In step S27 a group of observers is looking to the displayed image and the luminance BR of the pixel color is considered to substantially match the luminance LU if at least 90% of the group of observers do not observe annoying, or significant, or discernible luminance artifacts in the image. The test image may actually be a representation of a real world situation which is present also to the observers, and the luminance BR of the pixel color is considered to substantially match the luminance LU if at least 90% of the group of observers do not observe annoying, or significant, or discernible differences between the luminance of the color and the corresponding luminance.

Figure 12:
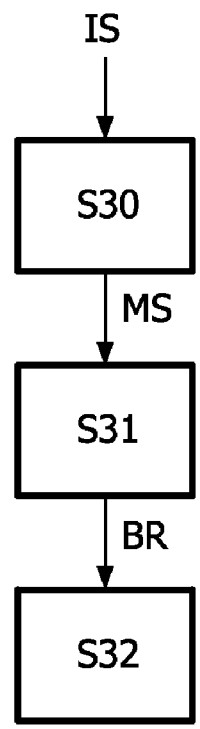
FIG. 12 shows another flowchart of the method of designing a display.

FIG. 12 shows another flowchart of the method of designing a display. The at least four primary colors RW, GW, BW, YW are selected by changing the chromaticity of at least one of the primary colors RW, GW, BW, YW or by adding an extra primary color.

In the step S30, a gamut mapping is applied to an input test image signal IS having a predefined set of different colors. In step S31, the luminance BR of the different colors displayed in response to the input test image IS is checked. In step S32, the chromaticity of at least one of the primary colors RW, GW, BW, YW to obtain the luminance BR substantially matching the luminance LU of the corresponding reflective spectrum RS is changed. Alternatively, or in addition thereto, a further primary color is added to the already present primary colors to obtain the luminance BR substantially matching the luminance LU of the corresponding reflective spectrum RS of the one of the primary colors causing a substantial deviation from the matching luminance LU. For example, if a much too high luminance BR is detected with respect to the luminance LU for a particular color, the new primary is given this or substantially this color.

Figure 13:
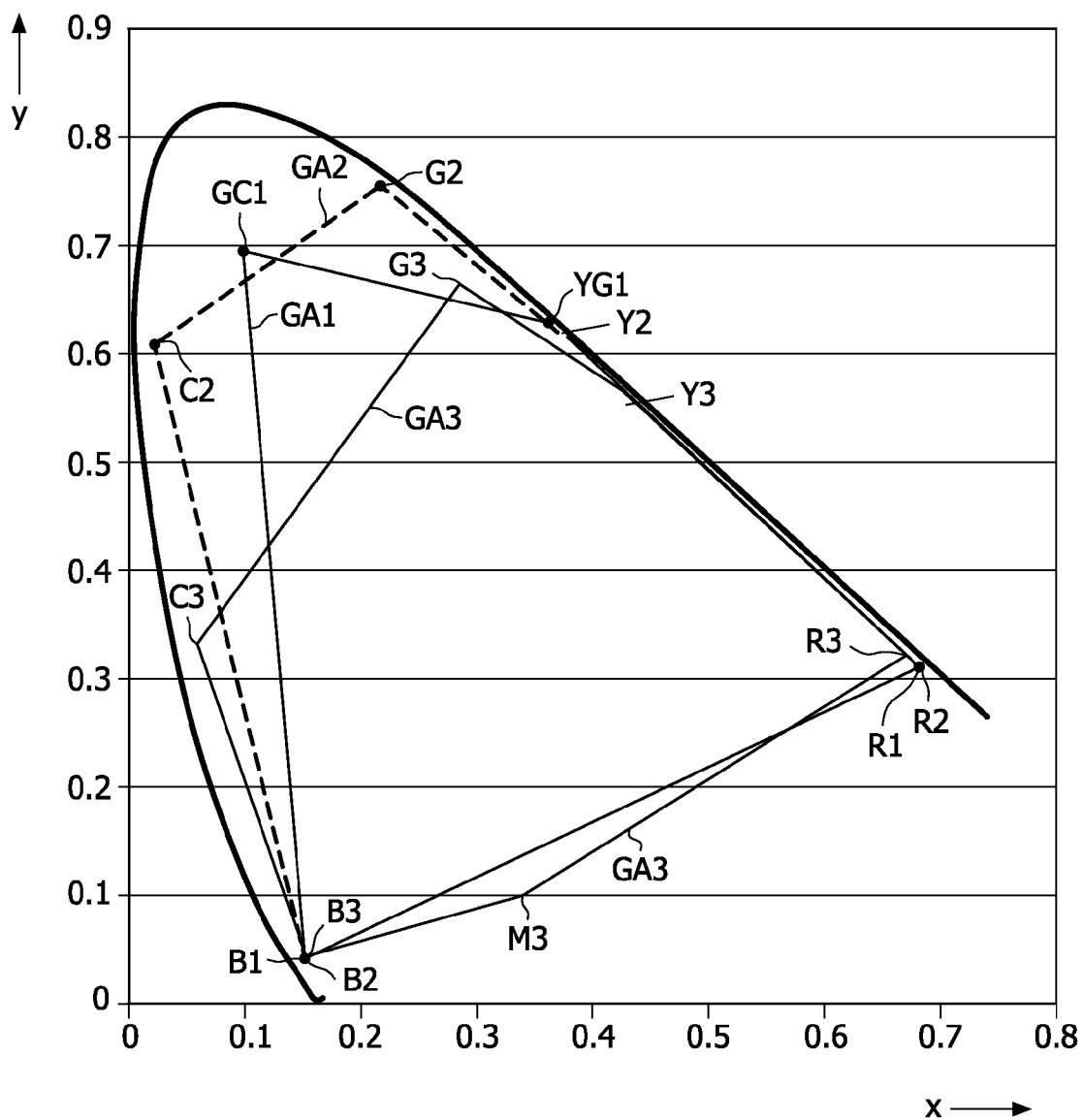
FIG. 13 shows examples of gamuts which have a substantially matching luminance.

FIG. 13 shows examples of gamuts which have a substantially matching luminance.

The first gamut GA1 is defined by the four primaries R, YG, GC, B with the x,y,Y coordinates, respectively for
R1: 0.6717, 0.3181, 19.6
YG1: 0.3564, 0.6319, 68.1
GC1: 0.0959, 0.6958, 33.1
B1: 0.1429, 0.0458, 7.1

The second gamut GA2 is defined by the five primaries R, G, B, C, Y with the x,y,Y coordinates, respectively for
R2: 0.6776, 0.3153, 17.1
G2: 0.2115, 0.7569, 34.4
B2: 0.1449, 0.0486, 7.1
C2: 0.0215, 0.6069, 10.5
Y2: 0.3681, 0.6208, 70.5

The third gamut GA3 is defined by the six primaries R, G, B, C, M, Y with the x,y,Y coordinates, respectively for
R3: 0.6658, 0.3264, 20.0

G3: 0.2781, 0.6653, 66.9
B3: 0.1468, 0.0514, 6.6
C3: 0.0567, 0.3292, 9.9
M3: 0.3407, 0.0986, 10.3
Y3: 0.4308, 0.5597, 84.8

It should be noted that the above-mentioned embodiments illustrate rather than limit the invention, and that those skilled in the art will be able to design many alternative embodiments without departing from the scope of the appended claims.

For example, if an exact compensation of the luminance is not required, the look up table 1 need not comprise the exact luminances of the reflective objects. It may suffice to store approximate luminances of reflective objects. For example, an accuracy of + and −10% appeared to be sufficient.

The present color mapping can be advantageously implemented independent on the number of primaries used in the display as long as the display gamut differs from the input signal gamut.

One should understand that the above mapping technology can be realized in different apparatuses or software, e.g. it may form part of a photo processing software, enabling the saving of data in a device dependent format to be offered to a particular display later on. The correction can also be applied by a professional service, e.g. supplying the improved signals via a dedicated channel on internet, or as an improved signal on a memory (e.g. purchasable from a shop on a memory stick). One may also download correction profiles (e.g. the LUT) to apply on ones home computer, or receive a plug-in etc.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A color mapping method of mapping an input image signal into an output image signal for a display comprising display pixels having three or more sub-pixels with primary colors defining a display color gamut, the method comprises:
   using desirable luminances of reflective spectra of real world objects having different colors corresponding to different chromaticities within the display color gamut, wherein the reflective spectra are spectra of light reflected by respective ones of the real world objects, and wherein a desirable luminance is a total amount of light reflected by a corresponding one of the real world objects,
   gamut mapping the input image signal having input pixel colors defined by an input luminance and an input chromaticity to obtain a mapped image signal having corresponding mapped pixel colors defined by a mapped luminance and a mapped chromaticity, the input pixel colors lying within an input color gamut different from the display color gamut; and
   adapting the mapped luminance by using a factor being dependent on a difference between the desirable luminance and the mapped luminance to obtain an output luminance nearer to the desirable luminance than the mapped luminance, wherein the image output signal is defined by the mapped chromaticity and the output luminance.

2. A color mapping method as claimed in claim 1, wherein the using desirable luminances comprises retrieving the desirable luminances from a look-up table.

3. A color mapping method as claimed in claim 1, wherein the using desirable luminances comprises applying a mathematical model designed to generate such desirable luminances.

4. A color mapping method as claimed in claim 1, wherein the spectrum of the light reflected by a real world object is obtained by measuring the real world object illuminated with a predefined light source.

5. A color mapping method as claimed in claim 4, wherein the predefined light source is a wide spectrum light source, such as an equal energy or daylight spectrum.

6. A color mapping method as claimed in claim 1, wherein each one of the desirable luminances is a substantially maximal total amount of light reflected, as can preferably be determined by multiplying a chosen illuminant with a theoretical spectrum for each chromaticity, such as a spectrum which for each wave length has either 100% or 0% transmission.

7. A color mapping method as claimed in claim 1, wherein the adapting the mapped luminance comprises clipping the mapped luminance to substantially the desirable luminance.

8. A color mapping method as claimed in claim 2, further comprising a retrieving a further looked-up luminance by looking up the desirable luminance in the look-up table at the input chromaticity of the input signal, and wherein the adapting the mapped luminance comprises scaling the mapped luminance by the factor being substantially equal to a ratio of the looked-up luminance at the mapped chromaticity and the looked-up luminance at the input chromaticity.

9. A color mapping method as claimed in claim 1, wherein the gamut mapping only applies a gamut mapping to the input chromaticity, and wherein the mapped luminance is the input luminance.

10. A color mapping method as claimed in claim 1, wherein the gamut mapping provides a color enhancement.

11. A color mapping method as claimed in claim 10, wherein the color enhancement is a saturation boost.

12. A color mapping method as claimed in claim 1, wherein the display is a multi-primary display having a number of the primary colors higher than three.

13. A color mapping circuit for mapping an input image signal into an output image signal for a display comprising display pixels having sub-pixels with primary colors defining a display color gamut, the color mapping circuit comprising:
   a desirable luminance unit for generating desirable luminances of reflective spectra of real world objects having different colors corresponding to different chromaticities within the display color gamut, wherein each one of the reflective spectra is a spectrum of light reflected by a real world object, and wherein each one of the desirable luminances is a total amount of light reflected by the corresponding real world object,
   a gamut mapper for gamut mapping the input image signal having input pixel colors defined by an input luminance and an input chromaticity to obtain a mapped image signal having corresponding mapped pixel colors defined by a mapped luminance and a mapped chromaticity, the input pixel colors lying within an input color gamut different than the display color gamut, and
   an adapting circuit for using a factor being dependent on a difference between the desirable luminance and the mapped luminance to obtain an output luminance nearer to the looked-up luminance than the mapped luminance, wherein the image output signal is defined by the mapped chromaticity and the output luminance.

14. A display comprising display pixels having sub-pixels with primary colors defining a display color gamut and the color mapping circuit as claimed in claim 13.

15. A display as claimed in claim 14, comprising:
an LCD display panel with pixels comprising at least four sub-pixels with associated color filters for generating the at least four primary colors,
a drive circuit for receiving the image output signal to supply drive voltages to the at least four sub-pixels, and
a backlight unit for illuminating the display panel.

16. A display as claimed in claim 14, being a color sequential display for displaying the image output signal.

17. A display as claimed in claim 13, wherein the display is designed by:
determining or using luminances of reflective spectra at different chromaticities within the display color gamut, wherein the reflective spectra are the spectra of reflective objects having a substantial maximum reflectivity at the different chromaticities, respectively, and
selecting the at least four primary colors for obtaining, within the display color gamut, a luminance of a selected set of the pixel colors substantially matching the luminances of the reflective spectra at the chromaticities corresponding to the pixel colors of the selected set.

18. A non-transitory computer-readable storage media comprising code that when introduced to a processor controls the processor to execute the steps of the method as claimed in claim 1, comprising the steps:
gamut mapping the input image signal having input pixel colors defined by an input luminance and an input chromaticity to obtain a mapped image signal having corresponding mapped pixel colors defined by a mapped luminance and a mapped chromaticity, the input pixel colors lying within an input color gamut different than the display color gamut, and
adapting the mapped luminance by using a factor being dependent on a difference between the desirable luminance and the mapped luminance to obtain an output luminance nearer to the looked-up luminance than the mapped luminance, wherein the image output signal is defined by the mapped chromaticity and the output luminance.

* * * * *